(12) United States Patent
Westberg

(10) Patent No.: US 9,043,468 B2
(45) Date of Patent: May 26, 2015

(54) METHOD AND ARRANGEMENT FOR NETWORK RESOURCE MANAGEMENT

(75) Inventor: Lars Westberg, Enköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 219 days.

(21) Appl. No.: 13/505,095

(22) PCT Filed: Nov. 5, 2009

(86) PCT No.: PCT/SE2009/051255
§ 371 (c)(1),
(2), (4) Date: Apr. 30, 2012

(87) PCT Pub. No.: WO2011/056103
PCT Pub. Date: May 12, 2011

(65) Prior Publication Data
US 2012/0221706 A1    Aug. 30, 2012

(51) Int. Cl.
G06F 15/173    (2006.01)
G06F 15/16    (2006.01)
(Continued)

(52) U.S. Cl.
CPC ..... *H04L 12/5695* (2013.01); *H04L 2012/5631* (2013.01); *H04L 2012/5632* (2013.01); *H04L 12/2869* (2013.01); *H04L 47/801* (2013.01); *H04L 47/808* (2013.01); *H04L 47/822* (2013.01); *H04L 47/826* (2013.01); *H04W 28/16* (2013.01)

(58) Field of Classification Search
CPC .................. H04L 29/08144; H04L 29/08171; H04L 29/0818; H04L 29/06993; H04L 12/5695

USPC .................. 709/201, 225, 226, 228, 229, 235
See application file for complete search history.

(56) References Cited

U.S. PATENT DOCUMENTS 6,285,660 B1 *    9/2001    Ronen ........................... 370/259
6,487,170 B1 *    11/2002    Chen et al. .................... 370/231
(Continued)

FOREIGN PATENT DOCUMENTS

JP    2003-152791 A    5/2003
WO    WO 03/003760 A2    1/2003
WO    WO 03/003760 A3    1/2003

OTHER PUBLICATIONS

Japanese Notice of Reasons for Rejection with English Translation, JP Patent Application No. 2012-536744, Sep. 10, 2013.
(Continued)

*Primary Examiner* — Aftab Nasir Khan
(74) *Attorney, Agent, or Firm* — Myers Bigel Sibley & Sajovec, P.A.

(57) ABSTRACT

Method and arrangement for network resource management in a communication network, especially related to transfer of content. A content resource broker is introduced, which dynamically manages resources based on the size of the content to be transferred. The method and arrangement involve the obtaining of information on current and future network capacity, which is available for transfer of content; the receiving of a request from a requesting entity concerning resources for transfer of a content C; and the determining of whether the available network capacity within a predetermined response time is sufficient for transferring the content C before the predetermined response time has expired.

30 Claims, 7 Drawing Sheets

(51) Int. Cl.
*H04J 3/16* (2006.01)
*H04L 12/54* (2013.01)
*H04L 12/927* (2013.01)
*H04L 12/911* (2013.01)
*H04L 12/70* (2013.01)
*H04L 12/28* (2006.01)
*H04W 28/16* (2009.01)

(56) References Cited

U.S. PATENT DOCUMENTS

| | | | |
|---|---|---|---|
| 6,820,117 B1* | 11/2004 | Johnson | 709/223 |
| 7,437,458 B1* | 10/2008 | Stewart et al. | 709/226 |
| 7,768,934 B2* | 8/2010 | Yamanaka et al. | 370/252 |
| 2002/0029274 A1* | 3/2002 | Allen | 709/226 |
| 2002/0049841 A1* | 4/2002 | Johnson et al. | 709/225 |
| 2002/0087713 A1* | 7/2002 | Cunningham | 709/235 |
| 2002/0174227 A1* | 11/2002 | Hartsell et al. | 709/226 |
| 2003/0028641 A1* | 2/2003 | Zhang et al. | 709/226 |
| 2003/0158959 A1* | 8/2003 | Jayapalan et al. | 709/237 |
| 2004/0010592 A1* | 1/2004 | Carver et al. | 709/226 |
| 2005/0111423 A1* | 5/2005 | Anderson et al. | 370/341 |
| 2005/0188089 A1* | 8/2005 | Lichtenstein et al. | 709/226 |
| 2005/0228879 A1* | 10/2005 | Cherkasova et al. | 709/224 |
| 2006/0149854 A1* | 7/2006 | Rudkin et al. | 709/241 |
| 2006/0167987 A1* | 7/2006 | Yamane | 709/203 |
| 2008/0086536 A1* | 4/2008 | Seki et al. | 709/211 |
| 2008/0215723 A1* | 9/2008 | Takeshima et al. | 709/224 |
| 2008/0307469 A1* | 12/2008 | Swix et al. | 725/93 |
| 2009/0006599 A1* | 1/2009 | Brownrigg, Jr. | 709/223 |
| 2010/0021132 A1* | 1/2010 | Shiragaki et al. | 386/94 |
| 2010/0023974 A1* | 1/2010 | Shiragaki et al. | 725/58 |
| 2010/0095021 A1* | 4/2010 | Samuels et al. | 709/235 |
| 2010/0195602 A1* | 8/2010 | Kovvali et al. | 370/329 |
| 2012/0075990 A1* | 3/2012 | Wang | 370/230 |

OTHER PUBLICATIONS

International Search Report, PCT/SE2009/051255, Jul. 30, 2010.
Written Opinion of the International Searching Authority, PCT/SE2009/051255, Jul. 30, 2010.
Written Opinion of the International Preliminary Examining Authority, PCT/SE2009/051255, Dec. 15, 2011.
International Preliminary Report on Patentability, PCT/SE2009/051255, Jan. 30, 2012.

* cited by examiner

METHOD AND ARRANGEMENT FOR NETWORK RESOURCE MANAGEMENT

CROSS REFERENCE TO RELATED APPLICATION

This application is a 35 U.S.C. §371 national stage application of PCT International Application No. PCT/SE2009/051255, filed on 5 Nov. 2009, the disclosure and content of which is incorporated by reference herein in its entirety. The above-referenced PCT International Application was published in the English language as International Publication No. WO 2011/056103 A1 on 12 May 2011.

TECHNICAL FIELD

The invention relates to a method and an arrangement in a communication system, in particular to network resource management in a communication network with limited transport capacity.

BACKGROUND

Today, a large portion of all data traffic is related to transfer of content, such as e.g. music, movies, news, web-pages, etc. When the number of simultaneous transfers of content over a bottleneck in the network is increasing, the throughput for each of the transfer sessions decreases proportionally, since the total capacity shared by all simultaneous sessions over the bottleneck is constant. In principle, there is no maximum limit on the number of simultaneous transfers allowed over a specific resource, e.g. a transmission link.

Typically, TCP (Transmission Control Protocol) is the mechanism used to adjust the transfer rate depending on the load-conditions.

Further, a large part of the content transfers are made through so called file sharing, e.g. using Bit Torrent, which is a P2P (Peer-to-Peer) file sharing communications protocol. The use of file sharing enables large content files to be transferred over the Internet. However, the response time for the delivery of a file, i.e. the time from when the file is requested by a user until the file has reached its destination, could be very long when using file sharing.

Further, content such as web traffic and file transfers are usually transferred using so called "best effort". "Best effort" usually describes a network service in which the network does not provide any specific guarantees that data is delivered within a certain time limit, or at all, or that a user is given a certain QoS (Quality of Service) or a certain priority, or a specific minimum bandwidth guarantee. In a best effort network, users obtain an unspecified variable bit rate and delivery time, depending on the current traffic load.

Considering the above, there is still room for improvement regarding resource management in content transfer situations.

SUMMARY

It would be desirable to obtain a mechanism for reliable resource management in connection with content transfer. It is an object of the invention to address at least some of the issues outlined above. Further it is an object of the invention to provide a mechanism for resource management, which enables delivery of a requested content in a more predictable way within a predetermined time. These objects may be met by a method and apparatus according to the attached independent claims.

According to one aspect, a content resource broker unit (CRBU) is provided for network resource management in a communication network. The CRBU comprises a resource unit for obtaining information on current and future network capacity, which is available for transfer of content. The CRBU further comprises a receiving unit for receiving a request from a requesting entity, concerning network resources for transfer of a content C; and also comprises a determining unit for determining whether the available network capacity within a predetermined response time is sufficient for transferring the content C before the predetermined response time has expired. The CRBU further comprises a permission unit, which may admit the request if the content C could be transferred before the predetermined response time has expired.

According to another aspect, a method is provided for network resource management in a communication network. The method involves obtaining information on current and future network capacity, which is available for transfer of content. The method further involves receiving a request from a requesting entity concerning resources for transfer of a content C, and also involves determining whether the available network capacity within a predetermined response time is sufficient for transferring the content C before the predetermined response time has expired. A request is admitted if the content C could be transferred before the predetermined response time has expired.

The above method and arrangement may respectively be used to enable network resource management to be based on the volume, or size, of the content to be transferred. This provides a mechanism for improving e.g. QoE for content download over network bottlenecks by enabling avoidance of e.g. interruptions due to throughput scarcity.

The first method and arrangement may be implemented in different embodiments, comprising different combinations of some or all of the following features:

The response time may in some situations be negotiated between the CRBU and the requesting entity if e.g. the CRBU cannot fulfil a transfer within the response time indicated in a request. This feature adds flexibility to the system, and enables functionality where a level of strictness may be set to the response time indicated in a request.

The CRBU may comprise a scheduling unit taking the available network capacity and possibly the time sensitivity of the content C into account when scheduling the content C for transfer within the predetermined response time.

The scheduling unit may further assign a certain part of the available network capacity to the transfer of content C dynamically during the predetermined response time.

In order for the requesting entity to receive information on when to start the content transfer, a response comprising an indication on when the transfer of content C can be started could be sent to the requesting entity if the request is admitted.

The CRBU works with volume of content and response time. Therefore, the CRBU should be able to obtain information on these parameters. The size of the content C, and/or the maximum response time, within which the content C should be delivered, could be derived from the received request. If one or both of these parameters are not explicitly included in the request, the size of the content C could be derived e.g. from a location where the content C is stored, and/or the response time could be estimated based on at least one of: content size, content type, user preferences, or user subscription type.

In order to support services, which require a minimum transfer rate, the CRB could also be able to derive a minimum transfer rate from the received request.

A priority level of a received request and/or a priority level of the content transfer indicated in a request may be taken into account when processing a received request. The priority levels may be indicated in the requests or be set by the CRBU based on at least one of: content size, content type, user preferences, or user subscription type.

The priority levels of already admitted, but not yet fulfilled, requests may be taken into account when obtaining information on current and future network capacity, which is available for transfer of content in the network. This feature enables flexibility by enabling the performance of one or more of the following features:

Admitted, but not yet fulfilled requests may be rejected; scheduled, but not yet fulfilled content transfers may be re-scheduled; and network resources which are pre-allocated to content transfers may be re-allocated, based on priority levels of requests and/or content transfers, or due to fluctuations in network capacity, e.g. in wireless links.

The features relating to priority enables prioritizing between e.g. different content transfers and different services in a way which renders resource management more efficient.

According to yet another aspect, a second method is provided in a requesting entity, for supporting network resource management in a communication network. The method involves sending a request concerning network resources for transfer of a content C to a content resource broker unit, which is able to manage network resources for transfer of content based on the size of the content to be transferred. The request should indicate the size of the content C and/or the response time, within which the content C should be delivered.

According to yet another aspect, a requesting entity is provided for supporting network resource management in a communication network. The requesting entity comprises a request unit for sending a request concerning network resources for transfer of a content C to a content resource broker, which is able to manage network resources for transfer of content based on the size of the content to be transferred, where the request indicates the size of the content C and/or the response time, within which the content C should be delivered.

The above second method and arrangement may be used in order to support the network resource management by providing essential information, such as e.g. the size of the content to be transferred to a content resource broker as the one previously described.

According to another aspect, a computer program product is provided, comprising instructions, which when executed by a processor, or the like, will perform the method according to any of the embodiments described above.

BRIEF DESCRIPTION OF THE DRAWINGS

The invention will now be explained in more detail by means of exemplary embodiments and with reference to the accompanying drawings, in which.

DETAILED DESCRIPTION

Figure 1:
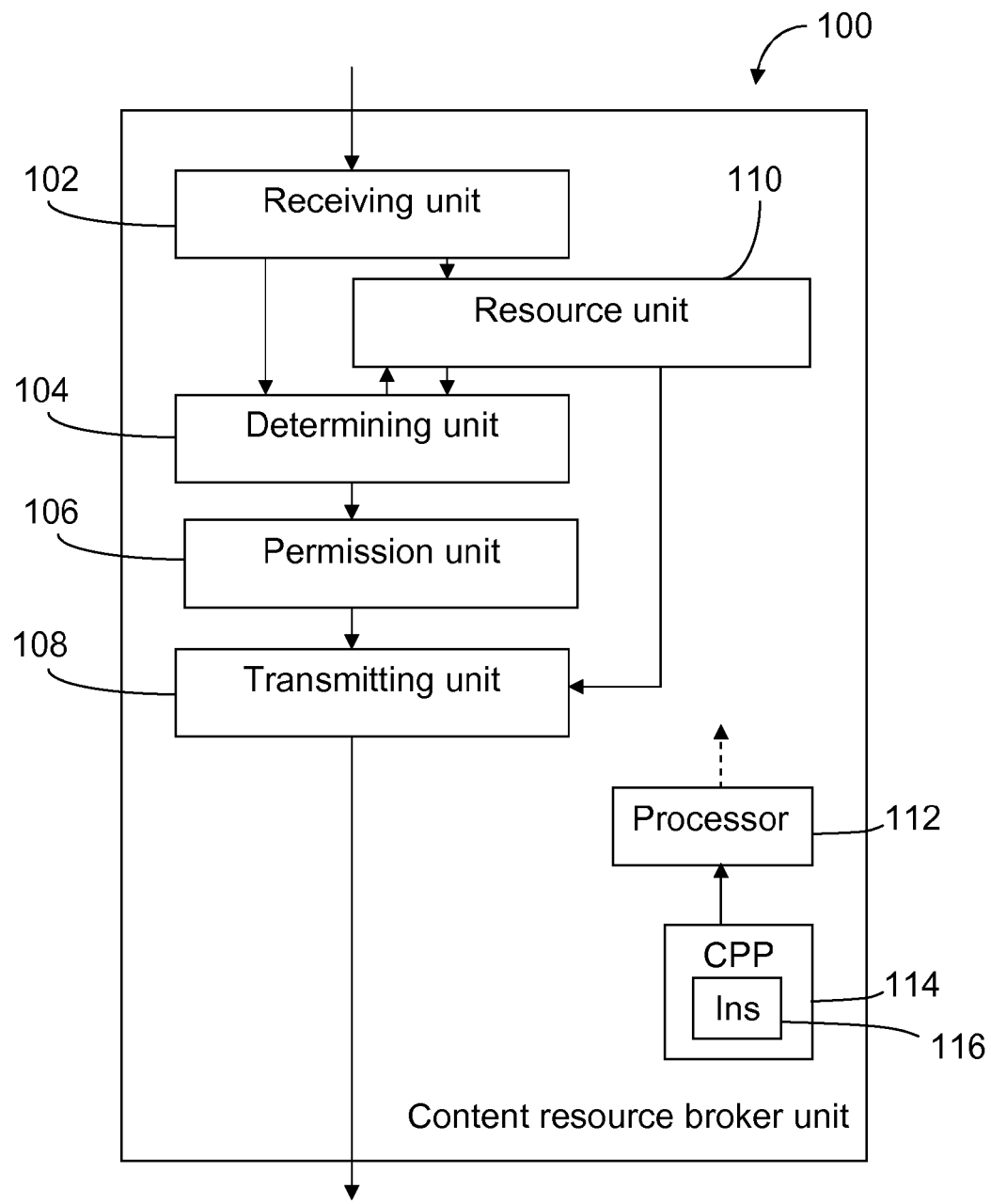
FIG. 1 is a block diagram illustrating an embodiment of a content resource broker unit.

Briefly described, a solution is provided for managing network resources for content transfer in a new and more controllable way in a network with limited transport capacity, by introducing a content resource broker, which can differentiate between different requests and take a predetermined response time into account when assigning network resources. The described resource management architecture can be applied to any traffic classes. The described resource management architecture is based on volumes of data, i.e. it is not based on the traditionally used "bits per second".

Within this document some expressions will be used, which will be briefly defined here. For example, the term "response time" is used as meaning the time from when a certain content has been requested by a user until said content has been delivered to its destination. The expressions "limited transport capacity" or "bandwidth limited network" is used to indicate that the network comprises bottlenecks with limited throughput capacity, which limits the passing traffic to a certain degree. In transport networks, it may indicate bandwidth limitations, and in wireless networks, the limitations may also be described by a signal-to-noise ratio. The term "content" is used as meaning information and experiences that may provide value for an end-user, for example films, news, video clips, music, games, texts e.g. novels, books, etc. The terms "volume" or "size" of a content are used as meaning the amount of bits which are needed to represent the content, i.e. the number of bits which needs to be transferred in order to deliver the content to a certain peer or end-user. This volume may be defined to include only the bits representing the actual content e.g. a coded film, or be defined to further include any additional control information which is also typically needed in order to transfer the content through a network.

The expressions "available network resources" and "available network capacity" refer to resources and capacity which are free and available to be used for a transfer of content. The resources may be non-allocated, but may also be previously allocated to e.g. a transfer of content of lower priority, and therefore be regarded as free and available to a transfer of content of a higher priority.

The links discussed in this document could be so called "virtual" links, which means that they may comprise several hops or sub-links, which may be wired or wireless.

Different types of content have different requirements on the response time. For example, some types of content are to be consumed rather immediately, e.g. videos from YouTube or web pages, while other types of content are for later use, e.g. file shared full size movies.

These differences in requirements can be exploited by a centralized resource broker, which uses information on the different transfer types and applies different kinds of prioritization mechanisms.

Currently, there are many kinds of resource broker architectures for real-time services, such as speech calls, which provide a CAC-function (Call Admission Control), which denies or admits received requests for resources. These resources are described in bits-per-second. The broker described in this document could also be adapted to support conventional requests for resources from e.g. real-time services, in order to provide an overall resource management service.

In the resource management procedure presented in this document, a new type of network resource broker will be introduced. This new type of network resource broker will be denoted "content resource broker" (CRB) or "bandwidth section broker". The main difference between the network resource broker described in this document and conventional brokers is that the conventional brokers work with bandwidth, in bits per second, as the requested and admitted resource, while the network resource broker described in this document works with the total volume of the content to be transferred, in bytes, and the time to download, i.e. the response time for the content to be transferred. Thus, a completely new resource management architecture is developed.

This new approach to resource management can with advantage be applied to Content Delivery Networks (CDN) and/or in networks where e.g. intermediate hosting of content is motivated from a QoE-perspective (Quality of Experience). One problem for QoE today, is that there is no guaranteed minimum bandwidth for content in a network. In the described resource management approach, however, both minimum bandwidth guarantee and differentiation between different delivery times in networks are supported. In a traffic mix of file sharing and QoE-sensitive traffic, the new architecture can be especially advantageous, by being able to provide a differentiated content transfer performance, which will be described in more detail below. The described architecture is also beneficial for other types of network services with better guarantees, i.e. in networks with a large volume of delivery of content, and where differentiation between different deliveries would improve the network performance.

The new network resource broker should be able to admit or deny a request for resources, in order to limit the number of simultaneous transfers. Further, the broker should be able to schedule the content indicated in a request based on information on free network capacity, which is available for transfer of content in the network. For example, a transfer of content could be delayed until enough free resources become available for allocation. The network resources are assigned to a certain transfer of content by the allocation of, often relatively large, time-slots, i.e. portions, sections or "chunks" of bandwidth. The portions could be of any size and could be dynamically assigned. It should be noted, that it is not fixed-size time-slots or subframes, as the ones commonly used in e.g. time division techniques that are referred to, but typically much larger slots, i.e. portions or "chunks". Such a portion or chunk could be in the size of Gbytes, while ordinary e.g. TDM time-slots typically are in the size of approximately 100 bytes.

Further, the broker should be able to distinguish and prioritize between, e.g. response time sensitive transfers and non-response time sensitive transfers, and requests having other priority grounds. The allocation of network resources could e.g. be performed based on response time, and could actively prioritize transfers that require a short response time, and vice versa. Further, the broker should be able to generate a response to an entity, which has made a request for network resources to the broker. The broker could also comply with a request for minimum bandwidth if necessary.

The new architecture may provide a minimum QoE guarantee and a shorter latency to applications that require that service. The solution described in this document could be applied in both wired and wireless networks and combinations thereof. For wireless networks, or more explicit cellular networks, the CRB could be embedded in a Radio Network Controller (RNC), in base stations, relay nodes or any other equipment that can perform the functionality described above. In wireless networks, e.g. WLAN 3G or LTE, the maximal throughput depends on several different aspects, such as e.g. distance to base station and radio conditions. Therefore, the bandwidth in a wireless network is not as static as in a wired network scenario. In a wireless network scenario, the resource broker needs to consider the dynamics of the bandwidth between terminals and network nodes. High-priority content transfer comes first, and content transfer of lower priorities comes after. The fluctuations in bandwidth may also cause re-scheduling of content and re-allocation of network resources. This may also result in that some of the already admitted requests are rejected.

The response time parameter, when indicated in a request for resources sent by a requesting entity, may comprise an indicator of the strictness of the indicated maximal response time. The indicated response time could be e.g. a strict non-negotiable response time, or a mere recommendation. In situations where the requested response time is indicated as negotiable, the CRB and the requesting entity may negotiate about the response time if e.g. the CRB cannot comply with the initially requested response time. When the response time is not indicated in a request for resources sent by a requesting entity, a response time may instead be estimated by the CRB, which will be further described below. The strictness of the estimated response time could then be set based on e.g. the time sensitivity of the content to be transferred, or e.g. per default be set as being negotiable. The strictness of the response time could be associated with the priority of the request. Priorities will be further discussed later below.

Figure 2:
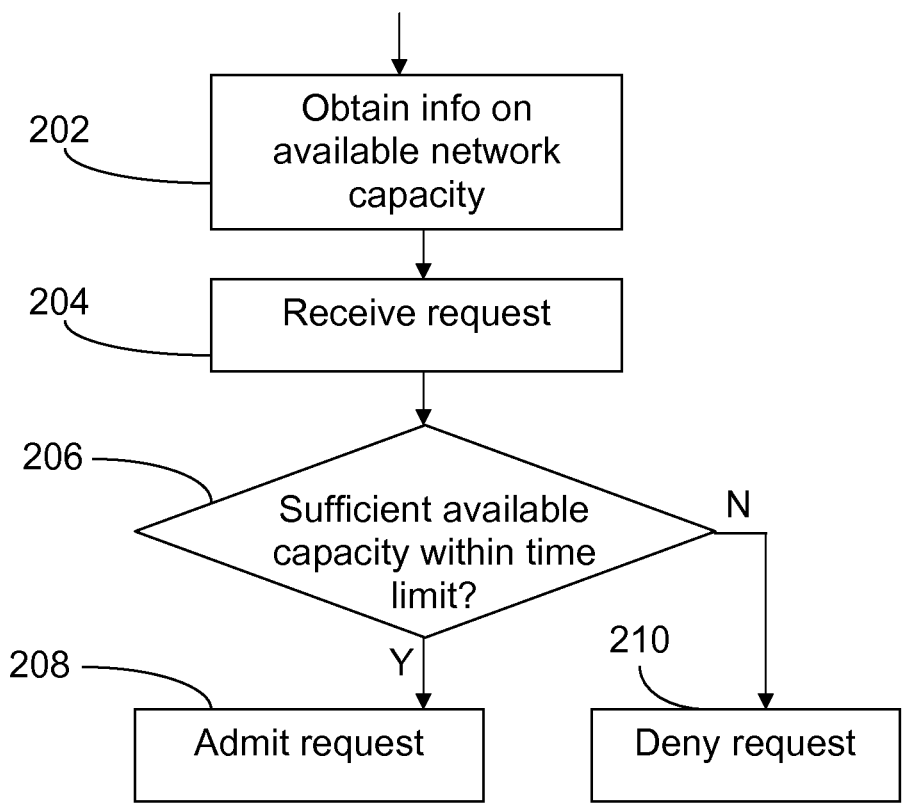
FIG. 2 is a flowchart illustrating an embodiment of method steps.

Below, an exemplary brokering procedure and an exemplary content resource broker unit (CRBU) will be described in more detail, with reference to the flowchart in FIG. 2:

FIG. 2 illustrates method steps to be performed in a content resource broker unit 200, according to one embodiment of the invention. Initially, information is obtained in a first step 202 on available network capacity, i.e. current and future slots or sections of bandwidth, which are free to be assigned to different content transfers. Then, a transfer request is received in a next step 204 from a requesting entity, which wishes to transfer a certain content C. Alternatively, the steps 202 and 204 could be performed in the opposite order. Then, it is determined in a next step 206 whether the available network capacity is sufficient for transferring the content C before a predetermined response time has expired. If the available network capacity is found to be sufficient, the received request is admitted in a step 208, and if the available resources are not found to be sufficient, the received request is denied in step 210. Alternatively a revised alternative response time may be presented to the requesting entity for approval or rejection.

FIG. 1, which is a block diagram, illustrates an embodiment of a content resource broker unit 100. The CRBU 100 comprises a receiving unit 102, adapted to receive requests from requesting entities concerning resources for transfer of content, and also adapted to receive information on available network capacity from various network entities. The CRBU 100 further comprises a resource unit 110 adapted to obtain information on available network capacity, i.e. current and future slots or sections of bandwidth, which are free to be assigned to different content transfers. This information could be provided to the CRBU in different ways, e.g. as an answer to a request made by the CRBU, or be broadcast or explicitly distributed on a regular basis. The information on available network capacity could also be estimated by the CRBU if no such information is obtainable e.g. from other network entities. The estimation of available network capacity could, e.g. be based on statistics on traffic loads e.g. at different times of the day, different weekdays, etc. The CRBU further comprises a determining unit 104, which is adapted to determine whether the available network capacity is sufficient for transferring a certain content C before the previously described response time has expired. Depending on if the available resources are found to be sufficient or not, the received request is admitted or denied in a permission unit 106, and the decision may be notified to the requesting entity by a transmitting unit 108.

Figure 3:
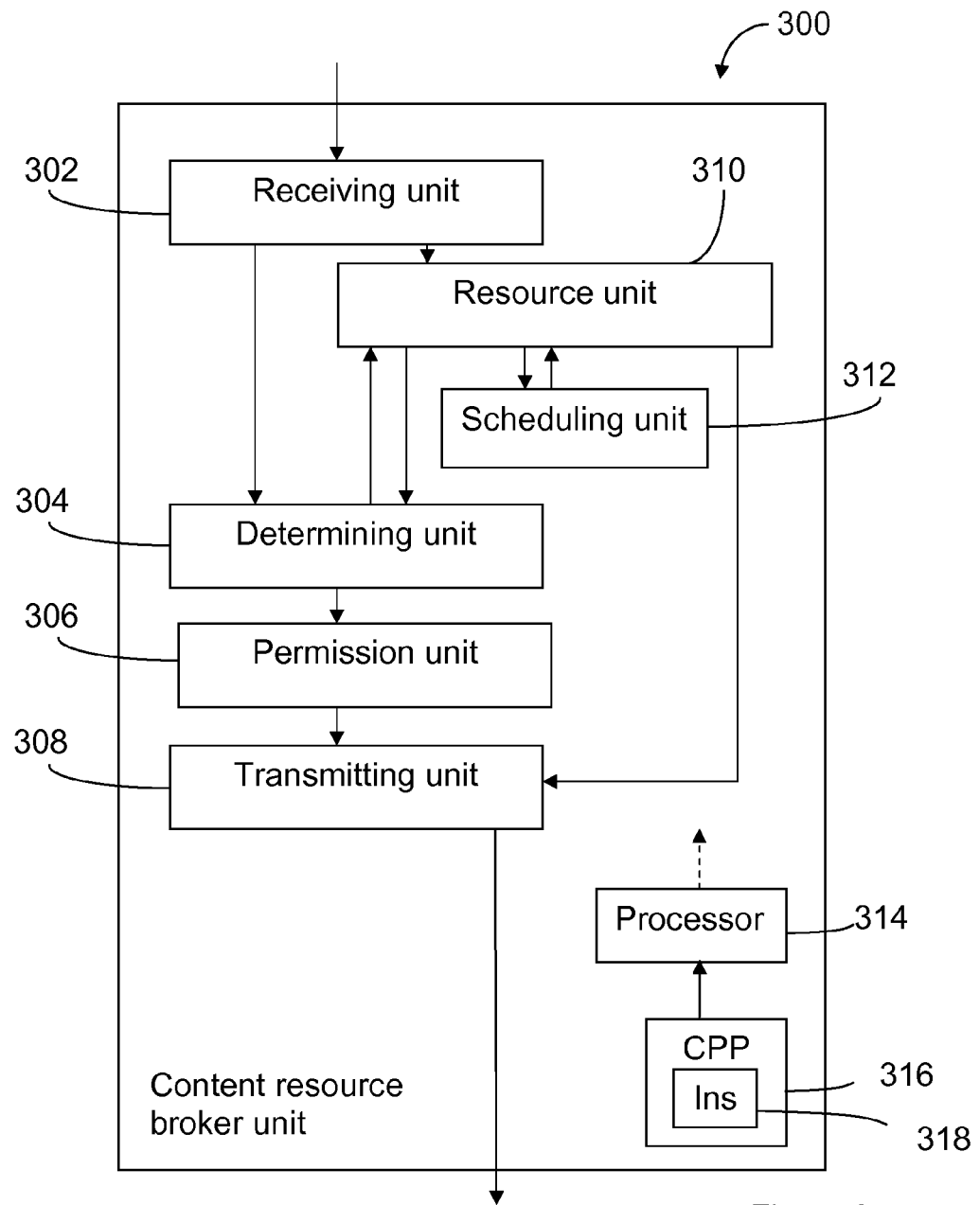
FIG. 3 is a block diagram illustrating another embodiment of a content resource broker unit.

The block diagram in FIG. 3 illustrates an embodiment of a content resource broker unit which is similar to the one illustrated in FIG. 1, but which also shows a scheduling unit 312. The scheduling unit 312 is adapted to schedule a certain content C for transfer within a predetermined response time, taking the information on available network capacity obtained by the resource unit 310 into account.

Figure 5:
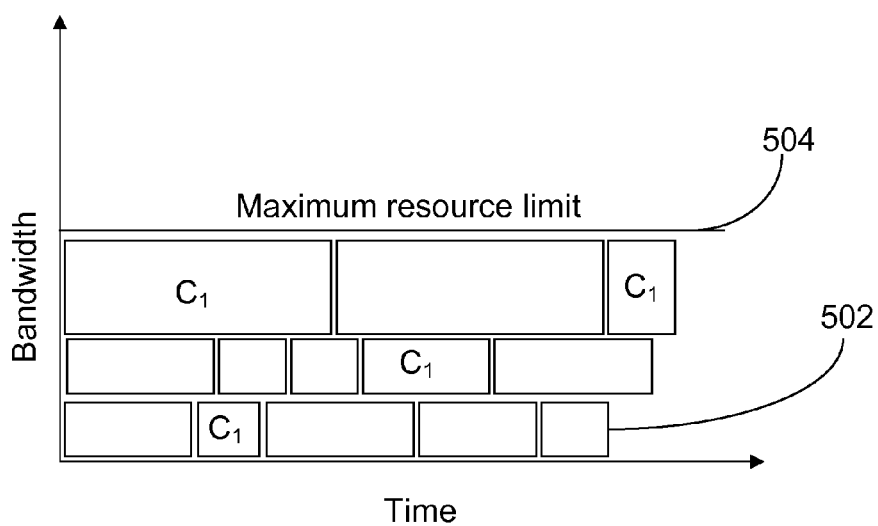
FIG. 5 is a schematic view illustrating allocation of network resources to a transfer of content, according to one embodiment.

The scheduling unit may take the response time sensitivity of the content into account when scheduling the content for transfer, so that e.g. a time sensitive content can be prioritized over a content which is not as time sensitive. The scheduling unit may further assign free available network resources dynamically to the transfer of a content. A content transfer will be assigned resources in form of slots of bandwidth 502, which is illustrated in FIG. 5.

In FIGS. 1 and 3 is also illustrated a computer program product 114, 316 which comprises instructions 116, 318, which when executed by a processor 112, 314 or similar, will cause the functional units 102-110 and 302-312, respectively, to perform their tasks according to an embodiment of the described procedure. The processor is connected to the illustrated functional units. These connections are only indicated as a dashed arrow emerging from the processor 112, 314.

Figure 4:
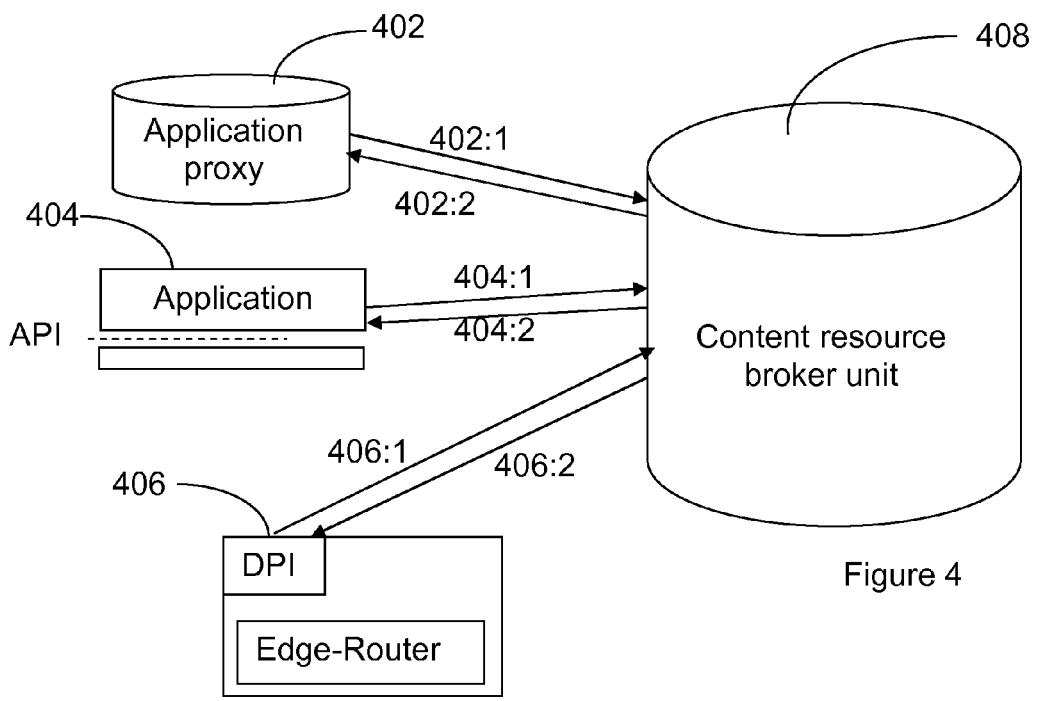
FIG. 4 is a schematic view illustrating different entities making requests to a content resource broker unit, according to one embodiment.

FIG. 4 illustrates a CRBU 408 receiving requests from different requesting entities, according to one embodiment. The CRBU 408 may receive requests 402:1, 404:1, 406:1 from a number of different network entities 402-406, for network resources for transfer of content. The requests may be generated e.g. explicitly by an API (Application Programming Interface) to an application 404; or by an application proxy 402, which analyzes the passing messages and sends a separate request to the broker when content is to be transferred. The request may further be generated by e.g. a DPI (Deep Packet Inspection) function 406, which inspects passing requests for content and sends corresponding requests for network resources to the CRBU.

Below, the network resources, requests and responses will be further described:

The resources managed by the CRBU are managed in terms of the combination of time [s] and bandwidth [bps], where the multiplication of time and bandwidth should equal, or be larger than, the volume to be transferred [bits or bytes]. The time and bandwidth are assigned as slots, or "chunks", of bandwidth, which could be of any size, and of different sizes, in terms of duration and bandwidth, within certain limits, which is illustrated in FIG. 5 as follows.

FIG. 5 illustrates the network resources in, e.g. a transmission link, which is managed by a CRBU according to one embodiment. As an example, the transfer of a content $C_1$ has been assigned the time-slots of bandwidth, which are indicated with $C_1$, and the remaining time-slots of bandwidth may already have been assigned to other content transfers or be available for assignment.

The CRB should be able to derive the parameters: volume (Gbytes) of the content to be transferred, and: the maximum response time for the content, from the request. The parameters could be derived directly from the request or indirectly, e.g. based on information in the request. If the content volume is not explicitly included in the request, the volume could e.g. be obtained from a location where the content indicated in the request is stored, e.g. a cache in a network node. If the maximum response time is not explicitly included in the request, the maximum response time could e.g. be estimated and set based on one or more of: the type of the indicated content; the size of the indicated content, user preferences and/or user subscription type.

Figure 8:
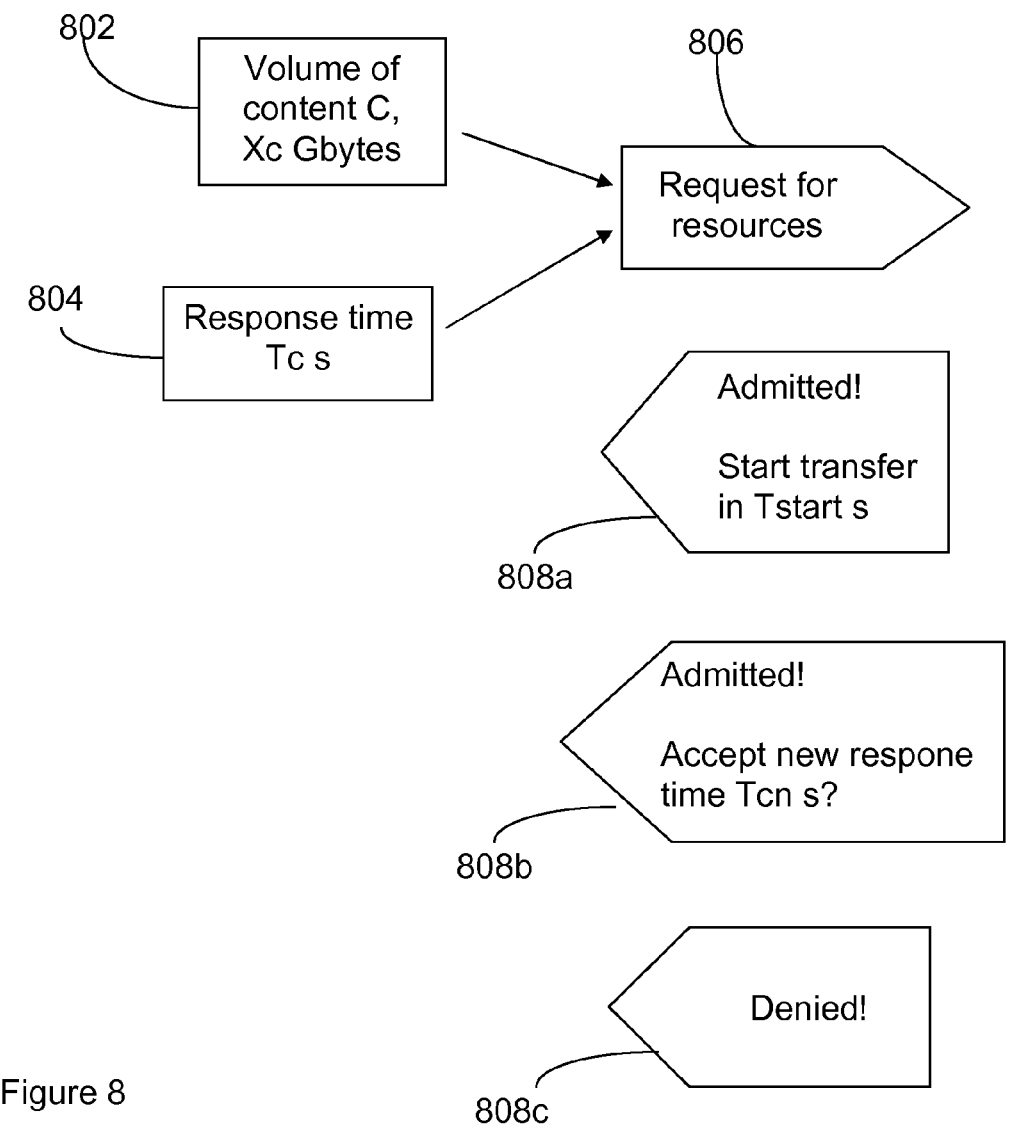
FIG. 8 is a schematic view illustrating the components of a request for resources and alternative replies to the request, according to one embodiment of the invention.

Exemplary components of a request, according to one embodiment, are illustrated in FIG. 8. A user of a requesting entity wants to transfer a content C. The requesting entity forms a request 806, which comprises the parameter 802 specifying the volume of the content C, which the user of the requesting entity wants to transfer. In the example, the volume is denoted Xc, and given in the unit of Gbytes. However, other unit variants for specifying the volume are also possible, such as e.g. bits. The request further comprises a parameter 804 specifying a maximal required or desired response time Tc seconds. The request 806 comprising the parameters 802 and 804 is sent to a first CRBU, which is the broker for all or a part of the network links, over which the content C is to be transferred. The first CRBU analyzes the available network resources, and if necessary, sends a request to a second CRBU. The first CRBU determines if there are sufficient free available network resources in order to transfer the content C within the response time Tc, and a response is sent by the CRBU to the requesting entity, here illustrated as the alternative responses 808a-c. The response may comprise an "admit" or a "deny" notification, and may include an indication on when the transfer of content C should or can be initiated. If a request does not comprise one or both of the parameters volume of content and response time, these parameters could be obtained in some other way by the CRBU receiving the request, as previously stated.

The CRB could also be adapted to support requests for resources which further include a request for a minimum transfer rate, in order to support applications which require a certain minimum transfer rate in bps (bits per second). To provide a minimum bandwidth may sometimes be important in order to achieve an appropriate QoE for e.g. progressive download, which is used by e.g. YouTube and Web-TV applications. If a minimum bandwidth cannot be provided, such applications may suffer from interruptions in the transfers and thereby possibly in the content, when displayed to a user.

The responses sent to the requesting entities, illustrated as 402:2, 404:2 and 406:2 in FIG. 4, comprise a notification of admittance or denial of the request for resources. The response could comprise an alternative suggested response time, for the requesting entity to accept or reject. Further, the response could comprise an indication of when the transfer of content could be started, e.g. in 10 ms or 2 h.

Alternatively, a request and/or the response to the request could be queued in the CRBU until the transfer of content could be started, and then the response could be sent to the requesting entity with a permission to start the transfer.

Below, the CRBs ability to prioritize between requests will be discussed: The prioritization of different requests combined with scheduling of resources for transfer of content could be solved in different ways. A plurality of priority levels could be used, and the priority levels could, e.g. be indicated in the requests, or be derived from other information indicated in the requests, such as e.g. volume and/or maximum response time of the content indicated in the request. Alternatively, the priority level could be derived from the user preferences or the user subscription type, which can be obtained e.g. from a HLR (Home Location Register), or the like. A request, which has been admitted, could possibly be rescheduled or rejected if a request of higher priority is received by a CRB.

A priority level could also or alternatively be related to the content indicated in a request. The priority level of the transfer of the content could correspond to the priority level of the request, or not. A priority level of the content transfer could be used for example when scheduling content for transfer. Resources allocated to a content transfer of a lower priority level than the priority level of the content transfer to be scheduled could be considered as non-allocated, i.e. free for allocation, when scheduling the content for transfer.

The requests could be categorized with respect to priority and be placed in an appropriate priority queue of requests. When a request reaches the front of a queue and is to be served, the appropriate, possibly previously reserved, resources will be allocated to the transfer of the content indicated in the request in question if possible. If there are enough available resources to accomplish a transfer of the content indicated in the request, a response will be sent to the requesting entity indicating that the request has been admitted. If there are not enough available resources to accomplish the transfer of the content indicated in the request, a response may be sent to the requesting entity, indicating that the request has been denied. Alternatively, the CRB may send a response comprising a suggested new response time, which new response time may be based on the estimated delivery time. This suggested response time could then be either accepted or rejected by the requesting entity. It should be noted that any kind of priority mechanism can be used, such as e.g. weighted fair queuing (WFQ), strict priority queuing (PQ) or weighted round-robin (WRR), and the invention is not limited in this respect.

Below, a multi-hop brokering scenario, and a suggested ability of the CRBs to store content, will be described: The described resource managing architecture can be applied as a distributed architecture in an overlay network, where the overlay nodes may have a storage capacity. In each hop between nodes, the current CRB can admit or deny requests, given resource constraints for the outgoing link, and allocate resources e.g. in order to ensure a minimum end2end throughput in cases where a minimum throughput has been requested. The outgoing link may be a virtual or logical link, i.e. a link comprising several hops or sub-links. When more than one CRB cooperate in a multi-hop scenario, the maximum response time for a transfer of content should be divided between the CRBs which are involved in order to complete the transfer. This division of the response time could be made in different ways, e.g. the CRBs could be provided with information on the distribution of CRBs, e.g. information on how many CRBs that will be involved in order enable a certain transfer, and the CRBs could then calculate the portion of the response time which they have to their disposal. Alternatively, each CRB could e.g. notify the next CRB in the multi-hop chain of how much of the response time that will be consumed in the transfer over the links which are brokered by the notifying CRB and the CRBs preceding the notifying CRB, i.e. how much of the response time that remains for the remaining part of the transfer.

A CRB may comprise or be co-located with a storage unit, e.g. a cache, which enables a local storage of the content to be transferred. Local storage of the content in transfer will enable the transfer of content to be shifted in time, i.e. in a controllable way be transferred over different links at different times, which may further increase the efficiency of the resource management.

Figure 6:
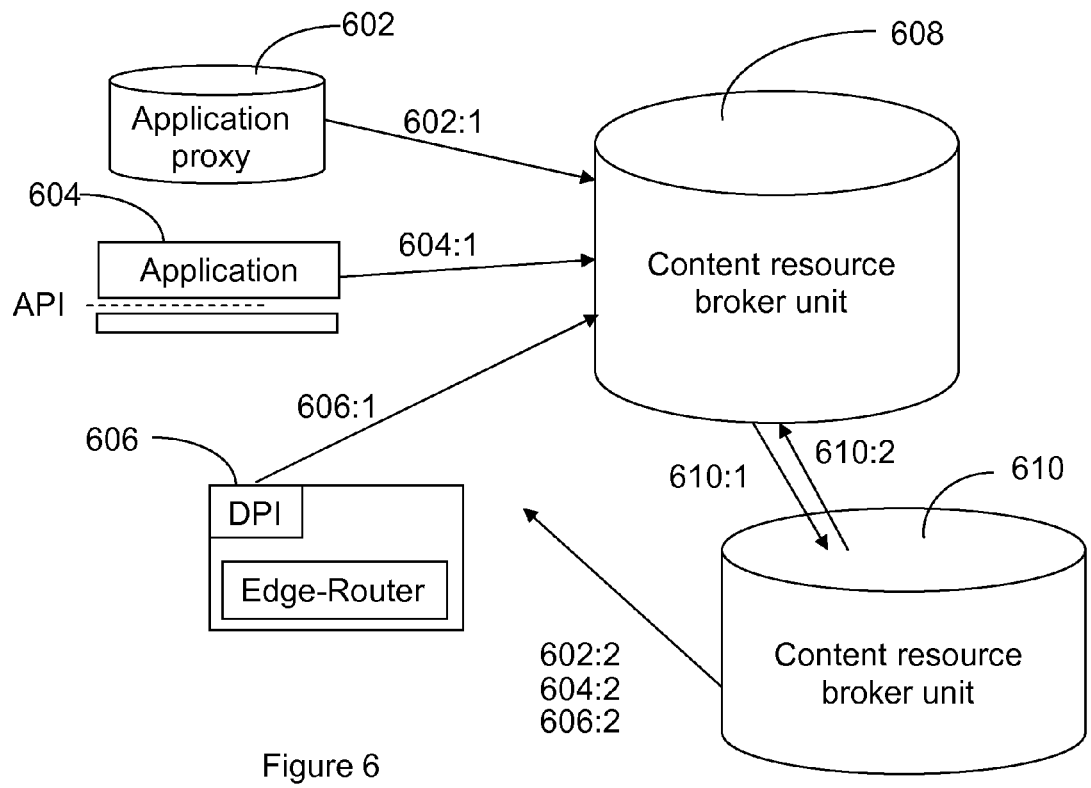
FIG. 6 is a schematic view illustrating multi hop brokering, according to one embodiment.

FIG. 6 is a schematic view showing cooperating CRBs in a multi-hop network. Each CRBU is the broker for a defined set of resources, such as a certain set of links, which may be so called virtual links. A first CRBU 608 receives e.g. requests 602:1, 604:1 and 606:1 from the requesting units 602, 604 and 606. The first CRBU 608 analyzes the available network resources in the set of links, for which CRBU 608 is the broker, in order to determine if there are sufficient free available network resources for transferring the content indicated in the requests within a part of the response times e.g. indicated in the requests. For example, if CRBU 608 finds that all of the requests 602-604:1 can be admitted, the appropriate resources are allocated, and a request 610:1 is sent from the first CRBU 608 to a second CRBU 610, which is the broker for a second set of links, over which the content indicated in the requests should be transferred. The second CRBU 610 then analyzes the available network resources in the set of links, for which the CRBU 610 is the broker, in order to determine if there are sufficient free available network resources for transferring the content indicated in the request (s) within the fractions of the response times which it has to its disposal. The CRBU 610 may for example determine that there are sufficient free available network resources in order to transfer the content indicated in requests 602:1 and 604:1, but not to transfer the content indicated in request 606:1. Then this is communicated to CRBU 608 in a response 610:2, which comprises "admit" for requests 602:1 and 604:1, and "deny" for request 606:1. Then, CRBU 610 allocates network resources for transfer of the content indicated in requests 602:1 and 604:1, and responds to the requesting entities 602-606, by sending the responses 602:2 and 604:2 comprising "admit", and the response 606:2 comprising "deny".

Alternatively, one or more of the responses to the requesting entities could be sent by the first CRBU 608 after receiving the reply 610:2 from the second CRBU 610. Here, a two-hop scenario has been illustrated, but the principle is the same in situations where more than two CRBUs are involved. When a request is denied by one CRBU, as the request 606:1 in the example, it would also be possible for the first CRBU 608, which admits request 606:1, to send a request to another CRBU, not shown in the figure, which may have enough network network resources, if the set of links, for which this other CRBU is the broker, is part of an alternative, redundant, route through the network to the destination of the content.

It is also possible that a request is admitted even though the estimated delivery times for all hops taken together exceeds the initially requested response time. In such a case, the requesting entity will receive a new suggested response time, in form of e.g. the total estimated delivery time for all hops, in a response from the CRBU, as previously mentioned.

Figure 7:
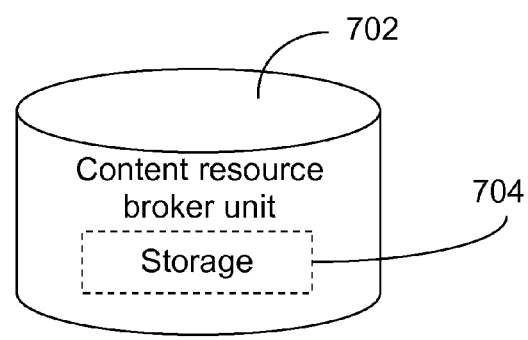
FIG. 7 is a schematic view illustrating storage of content in a content resource broker unit, according to one embodiment of the invention.

FIG. 7 illustrates a CRBU 702 comprising a content storage facility 704, e.g. a cache, according to one embodiment. In this storage entity 704, content can be temporarily stored during a transfer. In this way, one part of a transfer could be performed at a time when there are sufficient available resources in a first part of a network, and a second part of the transfer could be performed at a later time, when there are sufficient available resources in a second part of a network. Between the first and second part of the transfer, the content in transfer could be stored in the CRBU 702

Figure 9:
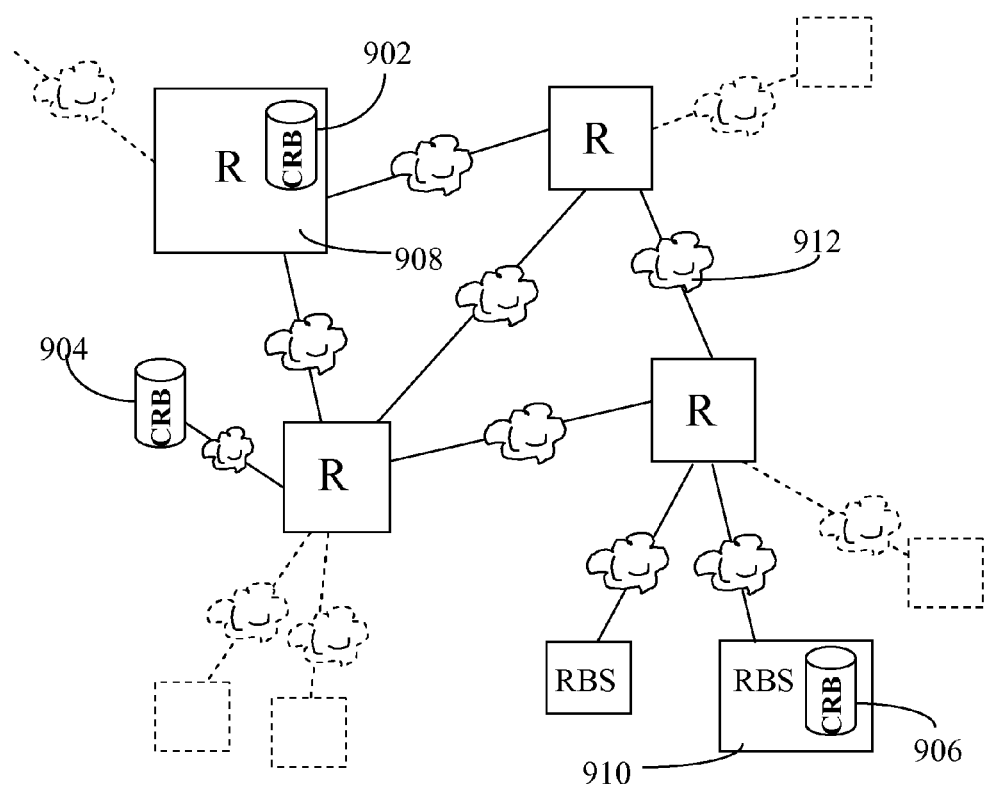
FIG. 9 is a schematic view illustrating exemplary location alternatives for content resource brokers in a network.

FIG. 9 illustrates exemplary alternative locations for content resource brokers in an exemplary network. The illustrated network comprises routing nodes (R) 908, e.g. routers or Ethernet switches. Further, the exemplary network comprises radio network nodes 910, e.g. radio base stations (RBS). The illustrated nodes are interconnected with each other and other nodes in the network by various links. These links could be of e.g. any suitable combination of wired and/or wireless links. Content resource brokers could act in and be located at many different levels in the network. CRBs could for example be placed in network nodes, e.g. in a routing node, as illustrated by CRB 902, and/or in a RBS, as illustrated by CRB 906. CRBs could further be located e.g. as separate nodes, as illustrated by CRB 904.

The network capacity resources may be of different types, e.g. IP-network resources, i.e. supported by MPLS-tunnels (MultiProtocol Label Switching); transmission links, i.e. SDH/PDH; or Ethernet resources, i.e. MEF-defined (Metro Ethernet Forum) SLAs (Service Layer Agreement). In wireless parts of a network, the network capacity over a wireless link can be modelled as throughput with statistical delivery guarantees.

Below, some concluding remarks will be made.

It should be noted that FIGS. 1 and 3 merely illustrate various functional units of the CRBUs 100 and 300 in a logical sense. However, the skilled person is free to implement these functions in practice using any suitable software and/or hardware means. Thus, the invention is generally not limited to the shown structure of the CRBUs 100 and 300. The procedure steps illustrated in FIG. 1 are also illustrated in a logical sense.

An advantage of the invention is that it enables a more efficient resource management for content delivery in bandwidth limited networks. The invention addresses the issue of QoE (Quality of Experience) for content delivery over bottlenecks by adding a resource manager function to a network. A QoS (Quality of Service) aspect could be added to transfer of content, since an architecture comprising embodiments of the invention enables differentiation of network performance for different types of content, such as e.g. file-sharing and QoE-sensitive traffic. The architecture may provide content delivery fulfilling certain QoE-requirements within a predetermined response time. The resource management according to embodiments of the invention may improve QoE for content download in such a way that the download is not interrupted by scarcity of network resources which provide throughput. The resource management is intended for content delivery and can be applied to e.g. transport networks and cellular wireless networks While the invention has been described with reference to specific example embodiments, the description is in general only intended to illustrate the inventive concept and should not be taken as limiting the scope of the invention. The different features of the exemplary embodiments above may be combined in different ways according to need, requirements or preference. The invention is generally defined by the following independent claims.

The invention claimed is:

1. A content resource broker apparatus for network resource management in a bandwidth limited communication network, comprising:
a processor; and
a memory coupled to the processor and comprising computer readable program code that when executed by the processor causes the processor to perform operations comprising:
obtaining information on current and future network capacity that is available for transfer of a content C;
receiving a request from a requesting entity concerning network resources for the transfer of the content C;
determining whether available network capacity of the current and future network capacity within a predetermined response time is sufficient for transferring the content C before the predetermined response time has expired, wherein the transferring the content C comprises transferring all of the content C, and wherein the predetermined response time is negotiated between the content resource broker apparatus and the requesting entity;
admitting the request in response to determining that the content C can be transferred before the predetermined response time has expired which is determined based on a priority level of the request, a maximal response time within which the content C should be delivered, and a volume of the content C to be transferred indicated in the request,
wherein the maximal response time is estimated in response to the maximal response time not being indicated in the received request, and
wherein the maximal response time is estimated in response to at least one of the following:
a. content size, b. content type, c. user preferences, and d. user subscription type; and
scheduling the content C for transfer within the predetermined response time, taking the available network capacity into account, in response to admitting the request.

2. The content resource broker apparatus according to claim 1, wherein a transfer rate of the content C is variable within the predetermined response time.

3. The content resource broker apparatus according to claim 1, wherein the scheduling comprises taking a time sensitivity of the content C into account when scheduling the content C for transfer.

4. The content resource broker apparatus according to claim 1, wherein the scheduling comprises assigning a certain part of the available network capacity to the transfer of the content C dynamically during the predetermined response time.

5. The content resource broker apparatus according to claim 1, wherein the operations further comprise generating a response to the requesting entity, comprising an indication on when the transfer of the content C can be started, in response to admitting the request.

6. The content resource broker apparatus according to claim 1, wherein the operations further comprise retrieving the size of the content C from a location where the content C is stored in response to the size of the content C not being indicated in the received request.

7. The content resource broker apparatus according to claim 1, wherein the available network capacity is determined based on an estimate of traffic loads at different times of day and/or on different days.

8. The content resource broker apparatus according to claim 1, wherein the scheduling the content C for transfer comprises prioritizing a time-sensitive portion of the content over another portion of the content which is not time-sensitive.

9. The content resource broker apparatus according to claim 1, wherein the scheduling the content C comprises assigning slots of bandwidth for the transfer of the content C.

10. The content resource broker apparatus according to claim 1, wherein the operations further comprise deriving a size of the content C and/or a maximum response time, within which the content C should be delivered, from the received request.

11. The content resource broker apparatus according to claim 10, wherein the operations further comprise deriving a minimum transfer rate from the received request.

12. The content resource broker apparatus according to claim 1, wherein the operations further comprise setting a priority level to the received request and/or to the content transfer indicated in said request in response to the priority level not being indicated in the received request.

13. The content resource broker apparatus according to claim 12, wherein the operations further comprise setting the priority level of the request and/or the content transfer in response to at least one of the following:
   a. content size, b. content type, c. user preferences, and d. user subscription type.

14. A method for network resource management in a bandwidth limited communication network, comprising the following operations executed by at least one or more processors in a content resource broker apparatus:
   obtaining, by at least one of the one or more processors, information on current and future network capacity that is available for transfer of a content C;
   receiving, by at least one of the one or more processors, a request from a requesting entity concerning resources for the transfer of the content C;
   determining, by at least one of the one or more processors, whether available network capacity of the current and future network capacity within a predetermined response time is sufficient for transferring the content C before the predetermined response time has expired, wherein transferring of the content C comprises transferring all of the content C, and wherein the predetermined response time is negotiated with the requesting entity;
   admitting, by at least one of the one or more processors, the request in response to determining that the content C can be transferred before the predetermined response time has expired, which is determined based on a priority level of the request, a maximal response time within which the content C should be delivered, and a volume of the content C to be transferred indicated in the request,
   wherein the maximal response time is estimated in response to the maximal response time not being indicated in the received request, and
   wherein the maximal response time is estimated in response to at least one of the following: a. content size, b. content type, c. user preferences, and d. user subscription type; and
   scheduling, by at least one of the one or more processors, the content C for transfer within the predetermined response time, taking the available network capacity into account, in response to the admitting the request.

15. The method according to claim 14, wherein a transfer rate of the content C is variable within the predetermined response time.

16. The method according to claim 14, wherein a time sensitivity of the content C is taken into account when scheduling the content C for transfer.

17. The method according to claim 14, wherein a certain part of the available network capacity is assigned to the transfer of the content C dynamically during the predetermined response time.

18. The method according to claim 14, wherein a response to the requesting entity, comprising an indication on when the transfer of the content C can be started, is generated in response to the request being admitted.

19. The method according to claim 14, wherein the size of the content C is retrieved from a location where the content C is stored in response to the size of the content C not being indicated in the received request.

20. The method according to claim 14, wherein at least part of the available network capacity occurs in one of the following types of resources in a wired network:
   a. IP-network resources,
   b. SDH/PDH resources, and
   c. Ethernet resources, and in a wireless network:
   d. air interface resources modeled as throughput with statistical guarantees.

21. A non-transitory computer program product comprising instructions, which when executed by a processor perform the method according to claim 14.

22. The method according to claim 14, wherein the available network capacity is determined based on an estimate of traffic loads at different times of day and/or on different days.

23. The method according to claim 14, wherein the scheduling the content C for transfer comprises prioritizing a time-sensitive portion of the content over another portion of the content which is not time-sensitive.

24. The method according to claim 14, wherein the scheduling the content C comprises assigning slots of bandwidth for the transfer of the content C.

25. The method according to claim 14, wherein a size of the content C and/or a maximum response time, within which the content C should be delivered, are derived from the received request.

26. The method according to claim 25, wherein a minimum transfer rate is derived from the received request.

27. The method according to claim 14, wherein the priority level is set to the received request and/or to the content transfer indicated in said request, in response to a priority level not being indicated in the received request.

28. The method according to claim 27, wherein the priority level of the request and/or the content transfer is set in response to at least one of the following:
   a. content size, b. content type, c. user preferences, and d. user subscription type.

29. A method for network resource management in a bandwidth limited communication network, comprising the following operations executed by at least one or more processors in a content resource broker apparatus:
   obtaining, by at least one of the one or more processors, information on current and future network capacity that is available for transfer of a content C;
   receiving, by at least one of the one or more processors, a request from a requesting entity concerning resources for the transfer of the content C;
   obtaining, by at least one of the one or more processors, information on a priority level of the received request, wherein priority levels of already admitted, but not yet fulfilled, requests are taken into account when obtaining information on the current and future network capacity which is available for transfer of content in the communication network;

performing, by at least one of the one or more processors, one or more of the following based on priority levels of requests and/or content transfers, or due to fluctuations in network capacity:
   a. rejection of already admitted but not yet fulfilled requests,
   b. re-scheduling of already scheduled, but not yet fulfilled content transfers, and
   c. re-allocation of network resources pre-allocated to transfer of content;

determining, by at least one of the one or more processors, whether available network capacity of the current and future network capacity within a predetermined response time is sufficient for transferring the content C before the predetermined response time has expired, wherein transferring of the content C comprises transferring all of the content C;

admitting, by at least one of the one or more processors, the request in response to determining that the content C can be transferred before the predetermined response time has expired, which is determined based on a priority level of the request, a maximal response time within which the content C should be delivered, and a volume of the content C to be transferred indicated in the request; and scheduling, by at least one of the one or more processors, the content C for transfer within the predetermined response time, taking the available network capacity into account, in response to the admitting the request.

30. A content resource broker apparatus for network resource management in a bandwidth limited communication network, comprising:
   a processor; and
   a memory coupled to the processor and comprising computer readable program code that when executed by the processor causes the processor to perform operations comprising:

obtaining information on current and future network capacity that is available for transfer of a content C;

receiving a request from a requesting entity concerning network resources for the transfer of the content C;

obtaining information on a priority level of the received request, wherein priority levels of already admitted, but not yet fulfilled, requests are taken into account when obtaining information on the current and future network capacity that is available for transfer of content in the communication network;

performing one or more of the following based on the priority levels of requests and/or content transfers, or due to fluctuations in network capacity:
   a. rejection of already admitted but not yet fulfilled requests,
   b. re-scheduling of already scheduled, but not yet fulfilled content transfers, and
   c. re-allocation of network resources pre-allocated to transfer of content;

determining whether available network capacity of the current and future network capacity within a predetermined response time is sufficient for transferring the content C before the predetermined response time has expired, wherein transferring of the content C comprises transferring all of the content C;

admitting the request in response to determining that the content C can be transferred before the predetermined response time has expired which is determined based on the priority level of the request, a maximal response time within which the content C should be delivered, and a volume of the content C to be transferred indicated in the request; and scheduling the content C for transfer within the predetermined response time, taking the available network capacity into account, in response to admitting the request.

\* \* \* \* \*

UNITED STATES PATENT AND TRADEMARK OFFICE
CERTIFICATE OF CORRECTION

| | |
|---|---|
| PATENT NO. | : 9,043,468 B2 |
| APPLICATION NO. | : 13/505095 |
| DATED | : May 26, 2015 |
| INVENTOR(S) | : Westberg |

Page 1 of 1

It is certified that error appears in the above-identified patent and that said Letters Patent is hereby corrected as shown below:

In the claims,

In Column 14, Line 19, in Claim 20, delete "network:" and insert -- network, --, therefor.

In Column 14, Line 20, in Claim 20, delete "air" and insert -- Air --, therefor.

Signed and Sealed this
First Day of December, 2015

Michelle K. Lee
*Director of the United States Patent and Trademark Office*